Patented July 26, 1927.

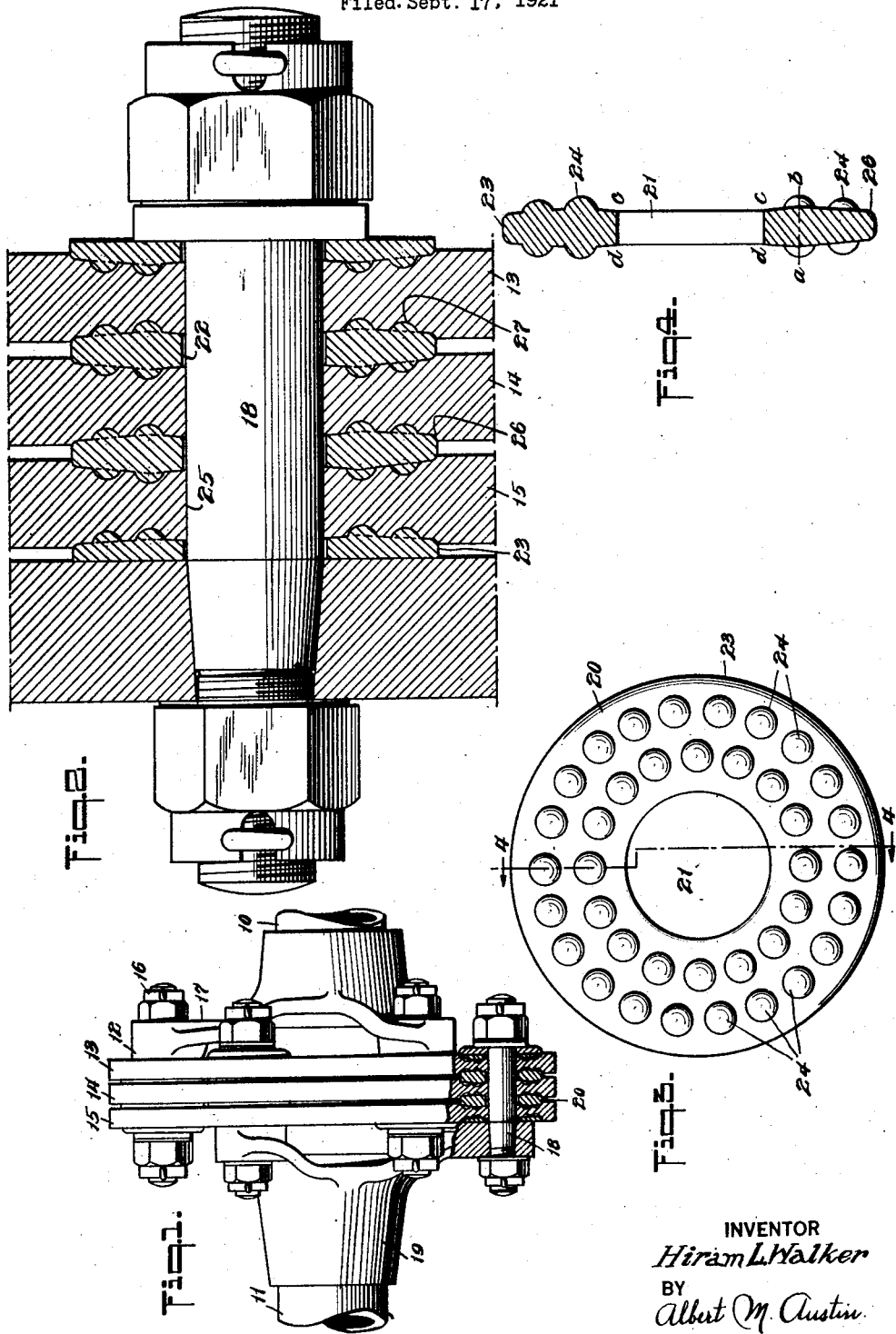

1,636,725

UNITED STATES PATENT OFFICE.

HIRAM L. WALKER, OF CLEVELAND, OHIO, ASSIGNOR TO CHANDLER CLEVELAND MOTORS CORPORATION, OF CLEVELAND, OHIO, A CORPORATION OF OHIO.

FLEXIBLE DRIVING COUPLING.

Application filed September 17, 1921. Serial No. 501,289.

The invention relates to an improvement in flexible driving couplings for installation between a driving and driven member in situations where permissible relative movement of the members in certain directions is desired for any reason, and as an illustration of one such situation it may be considered that the present invention relates to an improved flexible coupling in an automotive vehicle propeller shaft.

In such constructions it is usual to provide a set of disk members between the two parts of the shaft, adjacent pairs of which members may be considered as constituting driving and driven members in succession, to position flexible washers at circumferentially spaced apart points between opposing faces of the several pairs of members and to pass bolts through the disks, washers and bracket members at the adjacent ends of the shaft parts to form the coupling. The present invention relates specifically to an improved form of washer as a substitute for the usual flat washers used in these couplings.

The primary object of the invention when considering the coupling as a whole is to provide a simple form of device of the type outlined which will present high efficiency in the transmission of rotary torque between the members in their different relative positions and which at the same time will be free of looseness of parts while featuring a high degree of flexibility between the members.

Another object of the invention is to provide a construction of the type outlined in which torque transmission takes place between the lateral surface of a driving member and the adjacent lateral surface of the washer similarly takes place between the opposite lateral face of the washer and the adjacent driven member.

Referring specifically to the washer element of the disclosure an object of the invention is to provide an improved form of flexible power transmitting member for use in couplings of the class outlined and which can be readily formed, readily installed in place and which will retain a long life under actual working conditions.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view largely in side elevation showing a conventional form of drive shaft coupling with parts shown in section to illustrate a preferred embodiment of the invention positioned therein;

Figure 2 is an enlarged transverse sectional view taken axially through one of the bolts shown in Figure 1;

Figure 3 is a side view of one of the washers shown in Figure 2; and

Figure 4 is a transverse sectional view taken through the washer of Figure 3 and taken on the line 4—4 of Figure 3.

In the following description and in the claims, parts will be identified by specific names for convenience of expression but they are intended to be as generic in their application to similar parts as the art will permit.

In the drawings and referring particularly to Figure 1 there is shown a drive shaft of two parts 10 and 11 flexibly connected by means of a coupling 12 and in which either part of the shaft may be considered as the driving part and the other part as the driven part. The coupling includes a plurality of flat parallel disks 13, 14 and 15. Any two adjacent disks may be considered to form a driving and a driven member in the following description. The disks 13, 14 and 15 are connected at circumferentially spaced apart points with the shaft 10 by means of bolts 16 engaging a bracket 17 fixed to the end of the shaft 10 and similarly the disks are connected to the other shaft member 11 by bolts 18 and a bracket 19. Washers surround each of the bolts and are positioned in engagement with adjacent pairs of the disks 13, 14 and 15. If it be assumed that the washers are simply flat disks then the construction thus far described is of conventional form and this description is made simply to give a foundation to the inventive features hereinafter described.

The invention particularly resides in the configuration of the metal washer 20 positioned on the bolts and substituted for the usual flat washers. The washer is provided with a central aperture 21 for receiving the bolt and in practice the aperture is made of a diameter so that the bolt will have a free sliding fit therein or at most very little clearness 22, as shown in Figure 2. The washer is of a substantially flat ring shaped construction, is symmetrical in form, with a maximum thickness between the inner and outer peripheries. This maximum thickness is shown in the sectional view along the line a—b which is spaced outwardly from the aperture a distance of about one-third of the cross-sectional width of the ring. The ring tapers in width gradually from the maximum width a—b to a slightly less width c—d at the inner periphery of the ring outlining the aperture 21. The ring also decreases in thickness from the line a—b to the outer periphery 23 which is of minimum thickness and is preferably rounded as shown in Figure 4. From the cross-sectional showing in Figure 4 it will be seen that the inner portion of the ring outlined by the lines a, b, c, d, forms a regular trapezoid and the outer portion of the ring forms a similar trapezoid of about twice the radial length of the inner trapezoid.

Semi-spherical projections 24 are disposed in pairs on opposite sides of the washer and, as shown in Figure 3, are arranged in two concentric circles, preferably with the projections equally spaced apart, although irregular spacing may be used if desired, and the projections may be formed in various shapes.

The washers are formed preferably of metal, which is shaped by any suitable means as by a coining process, although other material such as rubber, leather or suitable composition may be employed. In the face of that portion of the disk surrounding the bolt holes 25, the semi-spherical projections 24, through pressure caused by the tightening of the bolts or studs or through wear, form shallow pockets 27, which receive and seat the projections and form a ball and socket fit therewith.

In operation it will be understood that the washers are disposed in engagement with the disks and the bolts tightened up to place the washers under compression as is usual in such constructions.

As the opposing faces of the disks are drawn together on the tightening of the bolts, the thick portion of the washers will act first upon the disc and cause the keystone cross section to intensify the gripping action of the washer on the disk. At the same time the compressing action on the disks will crowd the flexible material against the bolt and thus eliminate any clearance and incidental loose fitting of parts. At the same time there is produced a modulation of the compression of the washer as the outer periphery is approached. Engagement by the washer in this way removes the point of intense gripping from the place where the material is continually being deflected and in this way materially increase the endurance of the flexible disk while in use. As the greatest amount of flexing occurs at the outer edge of the washer the engagement of the washer in a loci of intense gripping removed from the edge eliminates restraint at the edge and thus offers the least resistance to the desired flexible movement of the coupling as a whole.

The spherical projections have the advantage of producing the same torque transmitting characteristic, irrespective of the relative position of the driving and driven members and, as they are of similar spherical shape and size, their effects are identical.

It is possible by means of a device of the type described to transmit torque forces through engaging lateral surfaces which has the effect of distributing strains over relatively large surfaces. This distribution of strain acts to insure a longer life to the strain transmitting washer than would be the case if the flexible members were compelled to transmit strains which were largely localized in some small part of the washer.

When the disks are formed of some kinds of fabrics the individual projections on the washer are inclined, when the washer is in use, to bury in between the weave of the fabric and thus eliminate crushing with its tendency to weaken the strength of the material should the projections be in the form of a continuous ridge.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a flexible shaft, the combination of a flexible driving member and a flexible driven member having opposing faces normally disposed in parallelism and adapted to be moved relative to each other, a bolt connecting the members and passing through said faces, a washer having an aperture through which the bolt is passed, said washer positioned between and engaged on opposite sides by said faces, said washer normally having a less thickness at the aperture than at a point remote from the aperture and progressively converging in cross-section from said remote point towards the aperture whereby the bolt in drawing the members together will cause the faces to press on the washer and crowd the flexible material of the driving and driven members towards the bolt and thus tend to elminate clearance.

2. In a device of the class described, the combination of two opposing members, a bolt passing therethrough, a washer on the bolt and engaged by the members, said washer having a relatively thick portion spaced from its aperture and gradually reducing in thickness towards the aperture whereby the bolt in drawing the members together will force the material of the opposing members towards the bolt.

3. An article of manufacture constituting an annular washer and comprising a member having pressure receiving sides and an aperture extending centrally therethrough, said member having a maximum thickness in spaced relation to the aperture and gradually reducing in thickness towards the aperture and studs projecting from the part of maximum thickness.

4. In a flexible shaft, the combination of a driving member and a driven member having opposing faces normally disposed in parallelism and adapted to be moved relative to each other, a bolt connecting the members and passing through said faces, a washer having an aperture through which the bolt is passed, said washer positioned between and engaged on opposite sides by said faces, said washer normally having a less thickness at its perimeter than at a point spaced inwardly from the perimeter thereby to produce a modulation of the compression of the washer as the perimeter of the washer is approached and to remove the loci of intense gripping of the members from the point where the disk is deflected when the members are moved.

5. In a device of the class described, the combination of two members having opposing faces capable of relative movement, a bolt connecting the members and passing through said faces, a circular washer fitted between the faces and having an aperture containing the bolt, said washer having a maximum thickness in spaced relation to the circumference and gradually decreasing in thickness to the circumference.

6. In a device of the class described, the combination of two distortable members having relative angular movement, an insert fitted therebetween in all relative positions thereof adapted to extend into the adjacent faces of both members and to distort said faces, said insert having a maximum thickness in a line between the two members and through an interior point of the insert and gradually reducing in thickness towards a free edge.

7. In a device of the class described, the combination of a pair of flexible members having relative angular movement, an insert fitted therebetween in all relative positions thereof, said insert having a maximum thickness at the point of greatest desired flexibility between the members and projections extending from said place of maximum thickness.

8. A ring washer with an inner and an outer periphery, said washer in cross-section being substantially in the form of two regular trapezoids with their longest parallel sides in engagement and with the outer trapezoid of greater length radially of the ring than the inner trapezoid.

9. In a flexible shaft, the combination of a driving member and a driven member having opposing faces normally disposed approximately in parallelism and adapted to have a slight freedom of movement relative to each other, said opposing faces being distortable from their normal configuration, a washer provided with substantially semispherical projections from opposite sides thereof engaging respectively the opposed distortable faces of said members, and a bolt passing through the washer and members, acting to clamp the washer between said opposing faces and tending to force the projections on the washer into the distortable faces of said members.

Signed at Cleveland, in the county of Cuyahoga and State of Ohio, this 13th day of September, A. D. 1921.

HIRAM L. WALKER.